US012584421B2

(12) United States Patent
Snyder et al.

(10) Patent No.: US 12,584,421 B2
(45) Date of Patent: Mar. 24, 2026

(54) HEAT EXCHANGER WITH INLET AND OUTLET TURNING VANES FOR USE IN GAS TURBINE ENGINES

(71) Applicant: Rolls-Royce North American Technologies Inc., Indianapolis, IN (US)

(72) Inventors: Douglas J. Snyder, Indianapolis, IN (US); Scott Schwenker, Indianapolis, IN (US); Patrick C. Sweeney, Plainfield, IN (US); Christopher DeBruhl, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 38 days.

(21) Appl. No.: 18/228,269

(22) Filed: Jul. 31, 2023

(65) Prior Publication Data

US 2025/0043696 A1 Feb. 6, 2025

(51) Int. Cl.
*F01D 25/00* (2006.01)
*F01D 9/04* (2006.01)
*F01D 25/14* (2006.01)

(52) U.S. Cl.
CPC ............. *F01D 25/14* (2013.01); *F01D 9/041* (2013.01); *F05D 2260/213* (2013.01)

(58) Field of Classification Search
None
See application file for complete search history.

(56) References Cited

U.S. PATENT DOCUMENTS

| | | | | |
|---|---|---|---|---|
| 3,310,287 | A * | 3/1967 | Clark | F01D 25/30 415/209.2 |
| 4,203,566 | A | 5/1980 | Lord | |
| 4,254,618 | A * | 3/1981 | Elovic | F28D 21/0014 60/39.83 |
| 6,106,229 | A | 8/2000 | Nikkanen et al. | |
| 6,382,559 | B1 * | 5/2002 | Sutterfield | B64C 15/02 244/12.4 |
| 9,587,561 | B2 | 3/2017 | Snyder et al. | |
| 9,733,026 | B2 | 8/2017 | Stieger | |
| 9,851,159 | B2 | 12/2017 | Cameron | |
| 10,125,684 | B2 | 11/2018 | Yu | |
| 10,830,543 | B2 | 11/2020 | Schmitz et al. | |
| 11,162,417 | B2 | 11/2021 | Qiu et al. | |
| 2007/0295492 | A1 * | 12/2007 | Sharp | F28F 13/06 165/151 |

(Continued)

FOREIGN PATENT DOCUMENTS

WO 2022129785 A1 12/2021

OTHER PUBLICATIONS

Fundamentals of Heat Exchanger Design, Ramesh K. Shah and Dusan P. Sekulic, 2003, pp. 848-852.

*Primary Examiner* — Edwin Kang
(74) *Attorney, Agent, or Firm* — Barnes & Thornburg

(57) ABSTRACT

A gas turbine engine includes a bypass duct and a heat-exchanger assembly. The bypass duct is configured to direct air through a flow path. The heat-exchanger assembly is configured to receive a first portion of the air flowing through the flow path of the bypass duct and to divert a second portion of the air flowing through the flow path around the heat-exchanger assembly.

19 Claims, 9 Drawing Sheets

(56) References Cited

U.S. PATENT DOCUMENTS

| | | | | |
|---|---|---|---|---|
| 2009/0188232 | A1* | 7/2009 | Suciu | B64D 27/18 60/785 |
| 2015/0052907 | A1* | 2/2015 | Murphy | F02C 7/185 60/783 |
| 2015/0176842 | A1* | 6/2015 | Doebbeling | F02C 6/003 60/776 |
| 2016/0108813 | A1* | 4/2016 | Schmitz | F02C 7/14 60/39.511 |
| 2017/0159462 | A1* | 6/2017 | Whurr | F02K 3/06 |
| 2019/0040801 | A1* | 2/2019 | Brooks | F02K 1/78 |
| 2019/0323429 | A1 | 10/2019 | McGee et al. | |
| 2019/0391047 | A1* | 12/2019 | Bristow | F02C 9/28 |
| 2020/0040765 | A1* | 2/2020 | Walsh | F02C 7/125 |
| 2021/0041188 | A1 | 2/2021 | Walsh et al. | |
| 2022/0290924 | A1* | 9/2022 | Eguchi | F28F 9/0278 |
| 2024/0384684 | A1* | 11/2024 | Terwilliger | F02C 7/141 |

* cited by examiner

HEAT EXCHANGER WITH INLET AND OUTLET TURNING VANES FOR USE IN GAS TURBINE ENGINES

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to heat-exchanger assemblies in gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion reaction are exhausted out of the turbine and may provide thrust in some applications.

Gas turbine engines also typically include a bypass duct arranged around the engine core. A fan included in the gas turbine engine forces air through the bypass duct and out of an aft end of the gas turbine engine to provide thrust to propel an aircraft. The bypass duct may include components such as struts, vanes, and heat exchangers that change a direction of the air flowing through the bypass duct. The air flowing through the bypass duct may experience flow separation and a pressure drop as the air passes through various components located in the bypass duct.

SUMMARY

The present disclosure may comprise one or more of the following features and combinations thereof.

A gas turbine engine may comprise a bypass duct and a heat-exchanger assembly. The bypass duct may be configured to direct air through a flow path to provide thrust to propel the gas turbine engine. The bypass duct may be arranged circumferentially around a central axis of the gas turbine engine and may include an outer wall that defines an outer boundary of the flow path and an inner wall that defines an inner boundary of the flow path. The heat-exchanger assembly may be configured to receive a first portion of the air flowing through the flow path of the bypass duct and to divert a second portion of the air flowing through the flow path around the heat-exchanger assembly. The heat-exchanger assembly may extend entirely radially between the outer wall and the inner wall of the bypass duct.

In some embodiments, the heat-exchanger assembly may include a heat exchanger, an inlet shroud, and an outlet shroud. The heat exchanger may be configured to transfer heat from a fluid to be cooled passing through the heat exchanger to the first portion of the air. The heat exchanger may be arranged in the bypass duct at an angle relative to the central axis of the gas turbine engine. The heat exchanger may have an inlet side and an outlet side spaced apart from and opposite the inlet side.

In some embodiments, the inlet shroud may be configured to change a direction of the first portion of the air flowing through the flow path toward the heat exchanger. The inlet shroud may include an inlet vane frame and a plurality of inlet turning vanes. The inlet vane frame may be coupled with the inlet side of the heat exchanger. The plurality of inlet turning vanes may be coupled with the inlet vane frame and may be configured to turn and direct the first portion of the air into the heat exchanger.

In some embodiments, the outlet shroud may be configured to change the direction of the first portion of the air flowing out of the heat exchanger. The outlet shroud may include an outlet vane frame coupled with the outlet side of the heat exchanger and a plurality of outlet turning vanes coupled with the outlet vane frame. The plurality of outlet turning vanes may be configured to turn and accelerate the first portion of the air exiting the heat exchanger so that the first portion of the air flows substantially parallel to the central axis to minimize concentrated cooling on the inner wall of the bypass duct and to minimize mixing losses downstream of the heat-exchanger assembly.

In some embodiments, each of the plurality of inlet turning vanes may include a leading edge and a trailing edge opposite the leading edge. The trailing edge of each of the plurality of inlet turning vanes may be spaced apart from the inlet side of the heat exchanger. Each of the plurality of outlet turning vanes may include a leading edge and a trailing edge opposite the leading edge. The trailing edge of each of the plurality of outlet turning vanes may be spaced apart from the outlet side of the heat exchanger. A gap between neighboring trailing edges of the plurality of outlet turning vanes may be adapted to control an outlet flow area of the outlet shroud so that an amount of the first portion of the air that flows through the heat-exchanger assembly and an amount of the second portion of the air that bypasses the heat-exchanger assembly is modulated.

In some embodiments, the inlet vane frame may include a first side wall, a second side wall spaced apart from the first side wall in a spanwise direction of the plurality of inlet turning vanes, and a shroud housing extending between the first side wall and the second side wall and outwardly away from the heat exchanger. The plurality of inlet turning vanes may be coupled to and extend between the first side wall and the second side wall of the inlet vane frame. The shroud housing may collect the first portion of the air and direct the first portion of the air into the inlet vane frame. The outlet vane frame may include a first side wall and a second side wall spaced apart from the first side wall in a spanwise direction of the plurality of outlet turning vanes. The plurality of outlet turning vanes may be coupled to and extend between the first side wall and the second side wall of the outlet vane frame.

In some embodiments, the outlet vane frame may include a first flange extending outwardly from the first side wall and a second flange extending outwardly from the second side wall. The first flange and the second flange may be coupled with the outlet side of the heat exchanger. The inlet vane frame may include a first side wall, a second side wall spaced apart from and opposite the first side wall in a spanwise direction of the plurality of inlet turning vanes, a first flange extending outwardly from the first side wall, and a second flange extending outwardly from the second side wall. The first flange and the second flange may be coupled with the inlet side of the heat exchanger.

In some embodiments, the first side wall and the second side wall of the inlet vane frame may both be formed to include a plurality of slots. Each of the plurality of inlet turning vanes may include an airfoil body, a first tab extending from a first end of the airfoil body and into one of the plurality of slots of the first side wall of the inlet vane frame, and a second tab extending from a second end of the airfoil body and into one of the plurality of slots of the second side wall of the inlet vane frame.

In some embodiments, each of the plurality of inlet turning vanes may include a leading edge and a trailing edge opposite the leading edge. The trailing edge of each of the plurality of inlet turning vanes may be formed to include notches that extend into the trailing edge toward the leading edge to increase uniformity of a velocity profile of the first portion of the air exiting the inlet shroud and entering the heat exchanger. Each of the plurality of outlet turning vanes may include a leading edge and a trailing edge opposite the leading edge. The trailing edge of each of the plurality of outlet turning vanes may be formed as a continuous trailing edge without notches.

According to another aspect of the present disclosure, a heat-exchanger assembly adapted for use with a gas turbine engine may comprise a heat exchanger, an inlet shroud, and an outlet shroud. The heat exchanger may be configured to receive a flow of air and to transfer heat from a cooling fluid to the flow of air. The heat exchanger may have an inlet side configured to receive the flow of air and an outlet side spaced apart from and opposite the inlet side and configured to direct the flow of air out of the heat exchanger.

In some embodiments, the inlet shroud may include an inlet vane frame located upstream of the inlet side of the heat exchanger and a plurality of inlet turning vanes coupled with the inlet vane frame. The inlet vane frame may include a first side wall, a second side wall spaced apart from the first side wall in a spanwise direction of the plurality of inlet turning vanes, and a shroud housing. The shroud housing may extend between the first side wall and the second side wall and outwardly away from the heat exchanger. The shroud housing may collect the flow of air and direct the flow of air into the inlet vane frame. The plurality of inlet turning vanes may extend between the first side wall and the second side wall and may be configured to turn and direct the flow of air toward the heat exchanger.

In some embodiments, the outlet shroud may include an outlet vane frame located downstream of the outlet side of the heat exchanger and a plurality of outlet turning vanes coupled with the outlet vane frame. The plurality of outlet turning vanes may be configured to turn and accelerate the flow of air exiting the heat exchanger.

In some embodiments, each of the plurality of inlet turning vanes may have a first chord length. Each of the plurality of outlet turning vanes may have a second chord length. The first chord length may be greater than the second chord length.

In some embodiments, a gap between neighboring trailing edges of the plurality of outlet turning vanes may be adapted to control an outlet flow area of the outlet shroud so that an amount of the flow of air that flows through the heat-exchanger assembly is modulated. Each of the plurality of inlet turning vanes may have a constant thickness. Each of the plurality of outlet turning vanes may have a constant thickness.

In some embodiments, each of the plurality of inlet turning vanes may include a leading edge and a trailing edge opposite the leading edge. The trailing edge of each of the plurality of inlet turning vanes may be spaced apart from the inlet side of the heat exchanger. Each of the plurality of outlet turning vanes may include a leading edge and a trailing edge opposite the leading edge. The trailing edge of each of the plurality of outlet turning vanes may be spaced apart from the outlet side of the heat exchanger.

In some embodiments, the inlet vane frame may include a first flange and a second flange. The first flange may extend outwardly from the first side wall of the inlet vane frame. The second flange may extend outwardly from the second side wall of the inlet vane frame. The first flange and the second flange may be coupled with the inlet side of the heat exchanger. The outlet vane frame may include a first side wall, a second side wall spaced apart from the first side wall in a spanwise direction of the plurality of outlet turning vanes, a first flange, and a second flange. The first flange may extend outwardly from the first side wall of the outlet vane frame. The second flange may extend outwardly from the second side wall of the outlet vane frame. The plurality of outlet turning vanes may be coupled to and extend between the first side wall and the second side wall of the outlet vane frame. The first flange and the second flange of the outlet vane frame may be coupled with the outlet side of the heat exchanger.

A method may comprise arranging a bypass duct circumferentially around a central axis of a gas turbine engine. The bypass duct may include an outer wall that defines an outer boundary of a flow path and an inner wall that defines an inner boundary of the flow path. The method may include arranging a heat exchanger in the bypass duct at an angle relative to the central axis of the gas turbine engine so that the heat exchanger extends entirely radially between the outer wall and the inner wall of the bypass duct. The method may include providing an inlet shroud having an inlet vane frame and a plurality of inlet turning vanes coupled with the inlet vane frame. The inlet vane frame may have a first side wall, a second side wall spaced apart from the first side wall in a spanwise direction of the plurality of inlet turning vanes, and a shroud housing. The shroud housing may extend between the first side wall and the second side wall and outwardly away from the heat exchanger. The method may include coupling the inlet vane frame of the inlet shroud upstream of the heat exchanger in the bypass duct.

In some embodiments, the method may include providing an outlet shroud having an outlet vane frame and a plurality of outlet turning vanes coupled with the outlet vane frame. The outlet vane frame may have a first side wall and a second side wall spaced apart from the first side wall in a spanwise direction of the plurality of outlet turning vanes. The method may include coupling the outlet vane frame downstream of the heat exchanger in the bypass duct. The method may include passing air through the flow path of the bypass duct. The method may include collecting a first portion of the air with the shroud housing of the inlet shroud. The method may include diverting a second portion of the air around the inlet shroud.

In some embodiments, the method may include adjusting a direction of the first portion of the air with the plurality of inlet turning vanes before the first portion of the air enters the heat exchanger so that the first portion of the air flows into the heat exchanger normal to an inlet side of the heat exchanger. The method may include adjusting the direction of the first portion of the air with the plurality of outlet turning vanes after the first portion of the air exits the heat exchanger so that the first portion of the air flows substantially parallel to the central axis. The method may include mixing the first portion of the air and the second portion of the air downstream of the outlet shroud.

In some embodiments, each of the plurality of inlet turning vanes may include a leading edge and a trailing edge opposite the leading edge. The trailing edge of each of the plurality of inlet turning vanes may be spaced apart from the heat exchanger. Each of the plurality of outlet turning vanes may include a leading edge and a trailing edge opposite the leading edge. The trailing edge of each of the plurality of outlet turning vanes may be spaced apart from the heat exchanger.

In some embodiments, the method may include adjusting a gap between neighboring trailing edges of the plurality of outlet turning vanes to control an outlet flow area of the outlet shroud so that an amount of the first portion of the air that flows through the inlet shroud and an amount of the second portion of the air that bypasses the inlet shroud is modulated.

These and other features of the present disclosure will become more apparent from the following description of the illustrative embodiments.

DETAILED DESCRIPTION OF THE DRAWINGS

Figure 1:
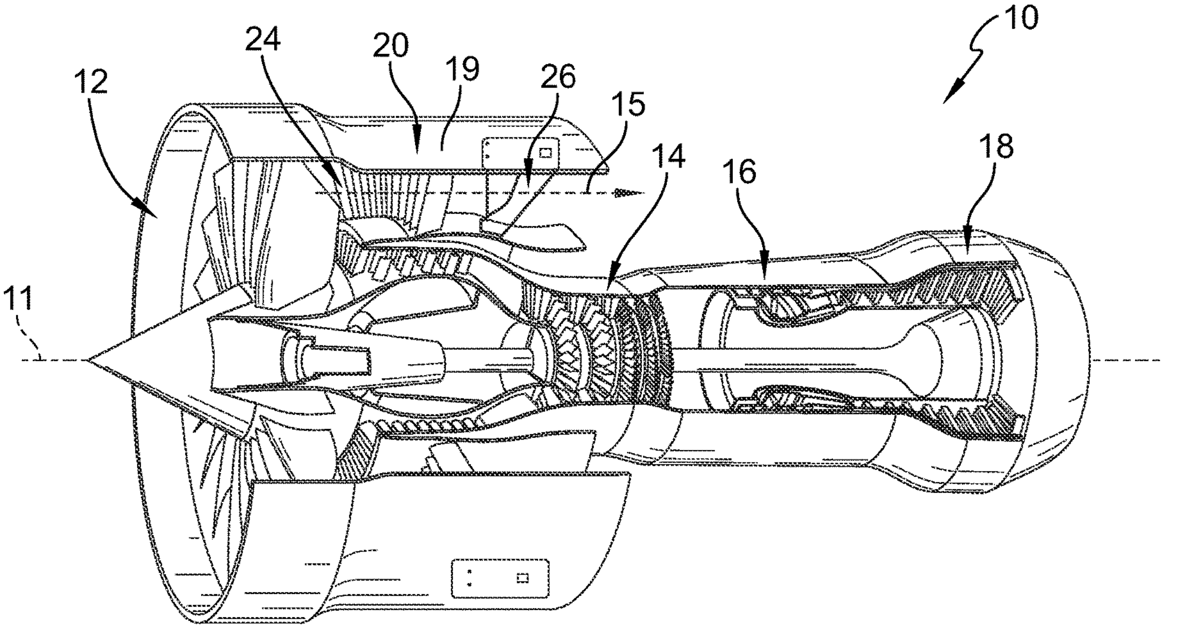
FIG. 1 is a cutaway view of a gas turbine engine that includes an engine core having a compressor, a combustor downstream of the compressor, and a turbine downstream of the combustor, and further including a fan driven by the engine core, a bypass duct arranged around the fan and the engine core, and a heat-exchanger assembly located in the bypass duct.

For the purposes of promoting an understanding of the principles of the disclosure, reference will now be made to a number of illustrative embodiments illustrated in the drawings and specific language will be used to describe the same.

An illustrative gas turbine engine 10 includes a fan assembly 12, a compressor 14, a combustor 16 located downstream of the compressor 14, and a turbine 18 located downstream of the combustor 16 as shown in FIG. 1. The fan assembly 12 is driven by the turbine 18 and provides thrust for propelling the gas turbine engine 10 by forcing air 15 through a bypass duct 20. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan assembly 12.

The fan assembly 12 rotates about the central axis 11 to force the air 15 through a flow path 24 such that the air 15 is directed through the bypass duct 20 to provide thrust to propel the gas turbine engine 10. The air 15 is ambient air and has a temperature that is less than the hot, high-pressure products of the combustion reaction experienced by the combustor 16 and the turbine 18. As such, a portion of the air 15 is used as a cold sink source in the present disclosure and used to cool oil, fuel, water, refrigerant, etc. for cooling the turbine 18 and/or other components such as electronics, motors, generators, etc.

Figure 2:
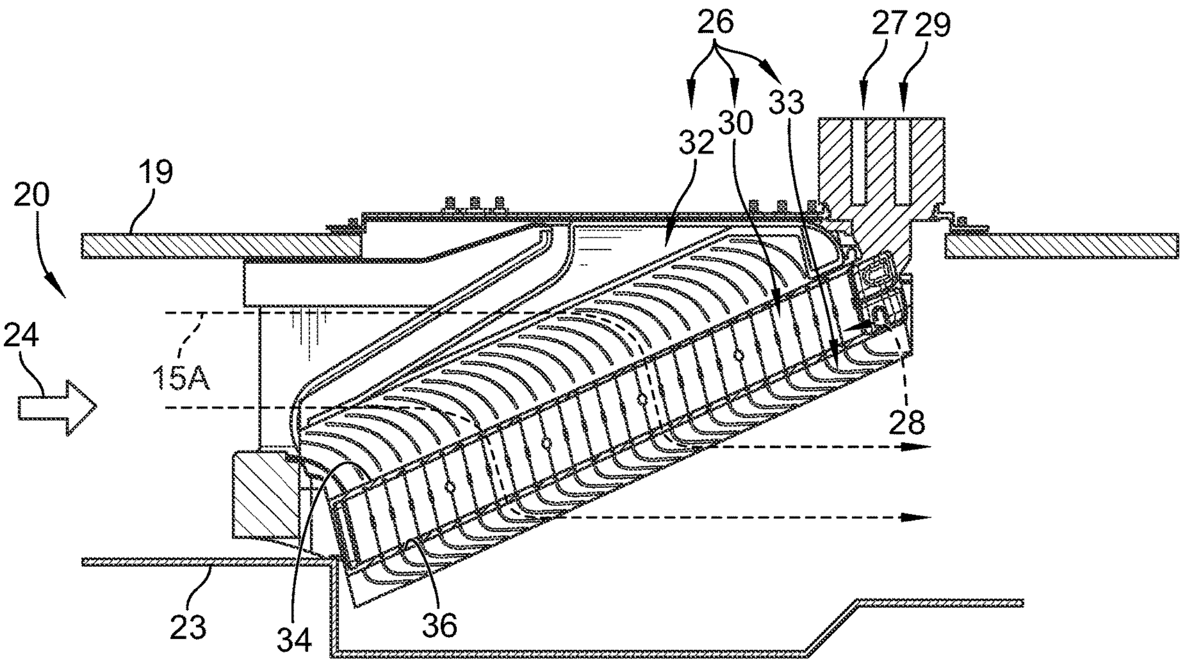
FIG. 2 is a section view of the bypass duct of the gas turbine engine of FIG. 1, showing the heat-exchanger assembly is arranged in the bypass duct and includes an inlet shroud having a plurality of inlet turning vanes, a heat exchanger coupled to the inlet shroud downstream of the inlet shroud, and an outlet shroud having a plurality of outlet turning vanes and coupled downstream of the heat exchanger whereby the inlet turning vanes help direct a flow of air through the heat exchanger while minimizing flow separation and the outlet turning vanes help direct the flow of air out of the heat exchanger while minimizing pressure loss such that the flow of air exiting the heat exchanger flows substantially axially aft.

The bypass duct 20 is arranged circumferentially around the central axis 11 and includes an outer wall 19 and an inner wall 23 as shown in FIGS. 1 and 2. The outer wall 19 defines a radially outer boundary of the flow path 24 of the bypass duct 20. The inner wall 23 defines a radially inner boundary of the flow path 24 of the bypass duct 20.

The air 15 entering the gas turbine engine 10 flows through the fan assembly 12 and the bypass duct 20 as shown in FIGS. 1 and 2. The air 15 is all of the air entering a forward end of the gas turbine engine 10, such that all of the air entering the bypass duct 20 flows between the outer wall 19 and the inner wall 23 of the bypass duct 20. The outer wall 19 of the bypass duct 20 is the radially outermost boundary for the air 15 flowing into a forward end of the gas turbine engine 10 and through the bypass duct 20. In the illustrative embodiment, a flow path for the air 15 is not formed radially outward of the outer wall 19.

The gas turbine engine 10 further includes a heat-exchanger assembly 26 located in the bypass duct 20 as shown in FIGS. 1 and 2. A first portion 15A of the air 15 flowing through the flow path 24 passes through the heat-exchanger assembly 26, and the heat-exchanger assembly 26 transfers heat from a fluid 28 passing through the heat-exchanger assembly 26 to the first portion 15A of the air 15. The fluid 28 may be, for example, oil, fuel, water, refrigerant, etc. The gas turbine engine 10 includes a plurality of heat-exchanger assemblies 26 spaced apart from one another circumferentially as suggested in FIG. 1. As such, each heat-exchanger assembly 26 is discrete axially and circumferentially and does not extend fully around the central axis 11. In other embodiments, the gas turbine engine 10 may include a single heat-exchanger assembly 26.

Figure 3:
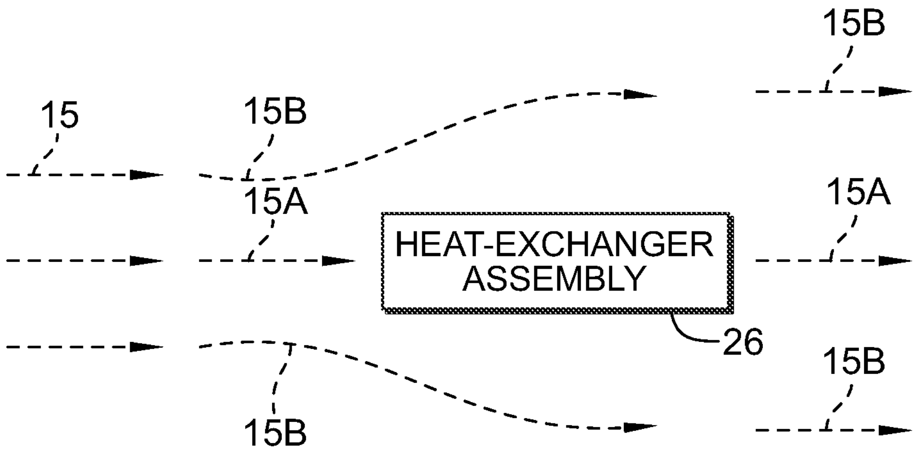
FIG. 3 is a diagrammatic view of the heat-exchanger assembly of FIG. 2 looking radially inward toward the heat-exchanger assembly, showing a first portion of the air flowing through the bypass duct passes through the heat-exchanger assembly and a second portion of the air is diverted around the heat-exchanger assembly through the bypass duct.

A second portion 15B of the air 15 is diverted around the heat-exchanger assembly 26 such that the second portion 15B of the air 15 does not pass through the heat-exchanger assembly 26 as shown in FIG. 3. An amount of the first portion 15A of the air 15 that passes through the heat-exchanger assembly 26 in comparison to an amount of the second portion 15B of the air 15 that is diverted around the heat-exchanger assembly 26 can be altered based on the cooling requirements of the gas turbine engine 10 by varying the inlet size, outlet size, vane geometry, etc. of the heat-exchanger assembly 26.

The heat-exchanger assembly 26 includes, among other things, a heat exchanger 30, an inlet shroud 32, and an outlet shroud 33 as shown in FIG. 2. The heat exchanger 30 is coupled to the inlet shroud 32 downstream of the inlet shroud 32. The inlet shroud 32 alters a direction of and diffuses the first portion 15A of the air 15 to flow into the heat exchanger 30 at a desired angle and improve uniformity of pressure and speed of the first portion 15A of the air 15 entering the heat exchanger 30. The heat exchanger 30 is configured to receive the first portion 15A of the air 15 flowing through the bypass duct 20 and transfer heat from the heat-exchanger assembly 26 to the first portion 15A of the air 15 to cool the fluid 28 within the heat exchanger 30. The outlet shroud 33, which may also be referred to as an outlet vane box 33, alters a direction of and accelerates the first portion 15A of the air 15 exiting the heat exchanger 30 to redirect the first portion 15A of the air 15 primarily in the axially aft direction as shown in FIG. 2.

The heat exchanger 30 includes an inlet side 34 and an outlet side 36 as shown in FIG. 2. The outlet side 36 is spaced apart from and opposite the inlet side 34. The inlet side 34 is coupled with the inlet shroud 32, and the outlet side 36 is coupled with the outlet shroud 33. The heat exchanger 30 includes a flow path located between the inlet side 34 and the outlet side 36. In the illustrative embodiment, the fluid 28 flows into an inlet 27 through the outer wall 19 of the bypass duct 20, into the flow path of the heat exchanger 30 axially forward, turns, and returns axially aft to an outlet 29 through the outer wall 19 of the bypass duct 20. In other embodiments, alternative inlet, outlet, and flow paths may be used.

The heat exchanger 30 extends at an angle relative to the central axis 11 as shown in FIG. 2. The heat exchanger 30 extends radially inward and axially forward from the outer wall 19 of the bypass duct 20. The heat exchanger 30 extends radially entirely between the outer wall 19 and the inner wall 23 of the bypass duct 20 such that the bypass duct 20 is blocked radially by the heat exchanger 30, though it will be understood the second portion 15B of the air 15 not flowing through the heat-exchanger assembly 26 flows around sides of the heat-exchanger assembly 26 as shown in FIG. 3. In the illustrative embodiment, the heat exchanger 30 has a length that is greater than an annular height of the bypass duct 20.

The air 15 flowing through the flow path 24 prior to reaching the heat-exchanger assembly 26 flows substantially axially parallel to the central axis 11 of the gas turbine engine 10 as shown in FIGS. 1 and 2 (the air 15 may have a circumferential component to its flow). Because the heat exchanger 30 extends at an angle relative to the central axis 11, the first portion 15A of the air 15 is turned radially inward by the inlet shroud 32 as it enters the heat-exchanger assembly 26 so that the first portion 15A of the air 15 flows generally orthogonally into the heat exchanger 30. The air 15 flows into the heat exchanger 30 normal to an inlet side 34 of the heat exchanger 30. The air 15 also flows into the heat exchanger 30 normal to an axis extending along tubes within the heat exchanger 30. As the first portion 15A of the air 15 exits the heat exchanger 30, the outlet shroud 33 turns the first portion 15A of the air 15 so that the first portion 15A of the air 15 flows substantially axially parallel to the central axis 11 again. The first portion 15A of the air 15 is directed primarily in an axially aft direction by the outlet shroud 33, instead of flowing radially inwardly toward the inner wall 23 of the bypass duct 20, as shown in FIG. 2.

Because the first portion 15A of the air 15 flows substantially parallel to the central axis 11 downstream of the heat-exchanger assembly 26, the first portion 15A of the air 15 also flows substantially parallel to the second portion 15B of the air 15 as shown in FIG. 3. The parallel flow of the first portion 15A and the second portion 15B of the air 15 allows the first portion 15A and the second portion 15B to mix downstream of the heat-exchanger assembly 26 while minimizing pressure losses that would result from non-parallel flows colliding with one another.

Figure 4:
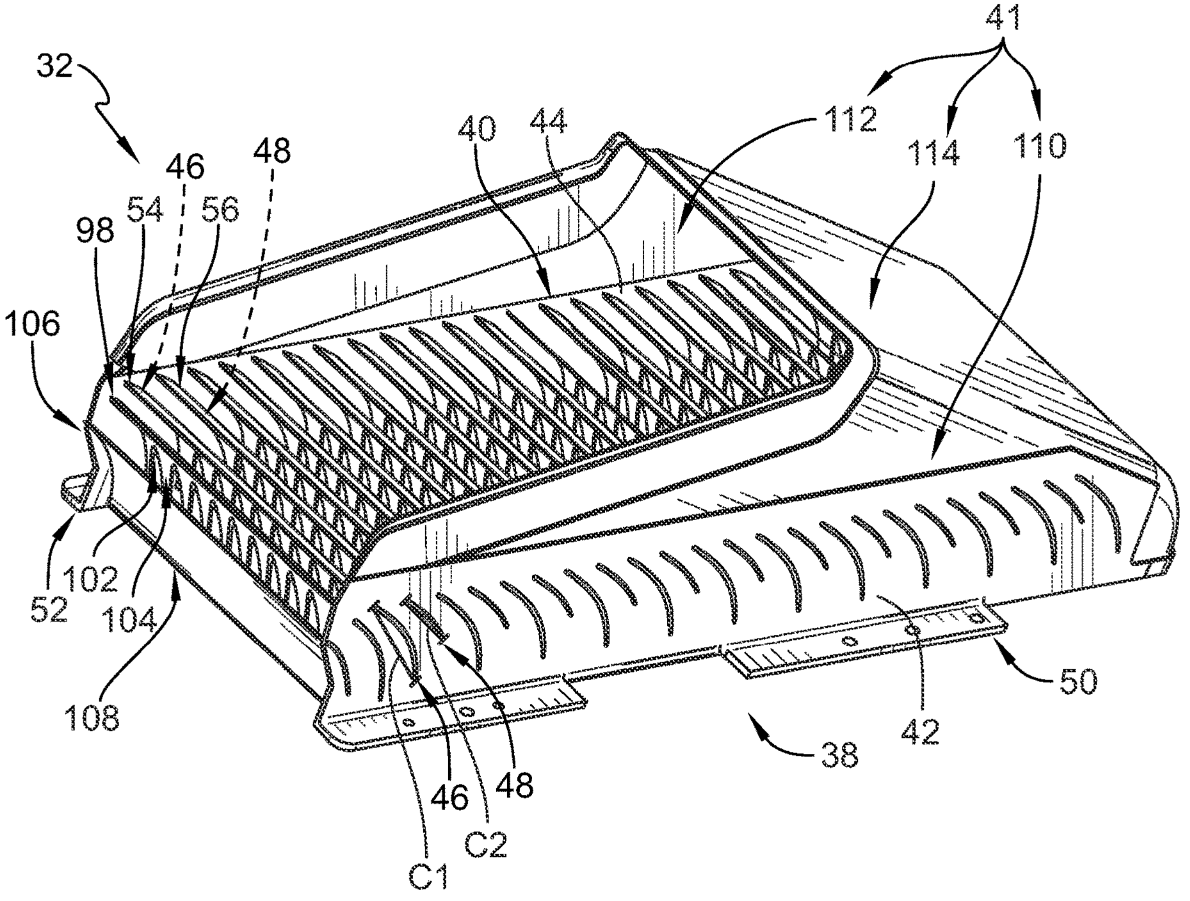
FIG. 4 is a perspective view of the inlet shroud of FIG. 2, showing the inlet shroud includes an inlet vane frame, the plurality of inlet turning vanes configured to adjust a direction of the flow of air as the air enters the heat exchanger, and a shroud housing, the inlet vane frame has a first side wall and a second side wall spaced apart from and opposite the first side wall, each of the plurality of inlet turning vanes extend between the first side wall and the second side wall, and the shroud housing is coupled with the inlet vane frame and collects the air that enters the heat exchanger.

The inlet shroud 32 of the heat-exchanger assembly 26 includes an inlet vane frame 38, a plurality of inlet turning vanes 40, and a shroud housing 41 as shown in FIG. 4. The plurality of inlet turning vanes 40 are located within the inlet vane frame 38. The plurality of inlet turning vanes 40 turn and diffuse the first portion 15A of the air 15 by adjusting a direction of the flow of the first portion 15A of the air 15 so that the first portion 15A enters the heat exchanger 30 in a direction normal to the inlet side 34 of the heat exchanger 30 in the illustrative embodiment. The shroud housing 41 is coupled with the inlet vane frame 38 and is configured to collect the first portion 15A of the air 15 prior to entering the heat exchanger 30.

Figure 5:
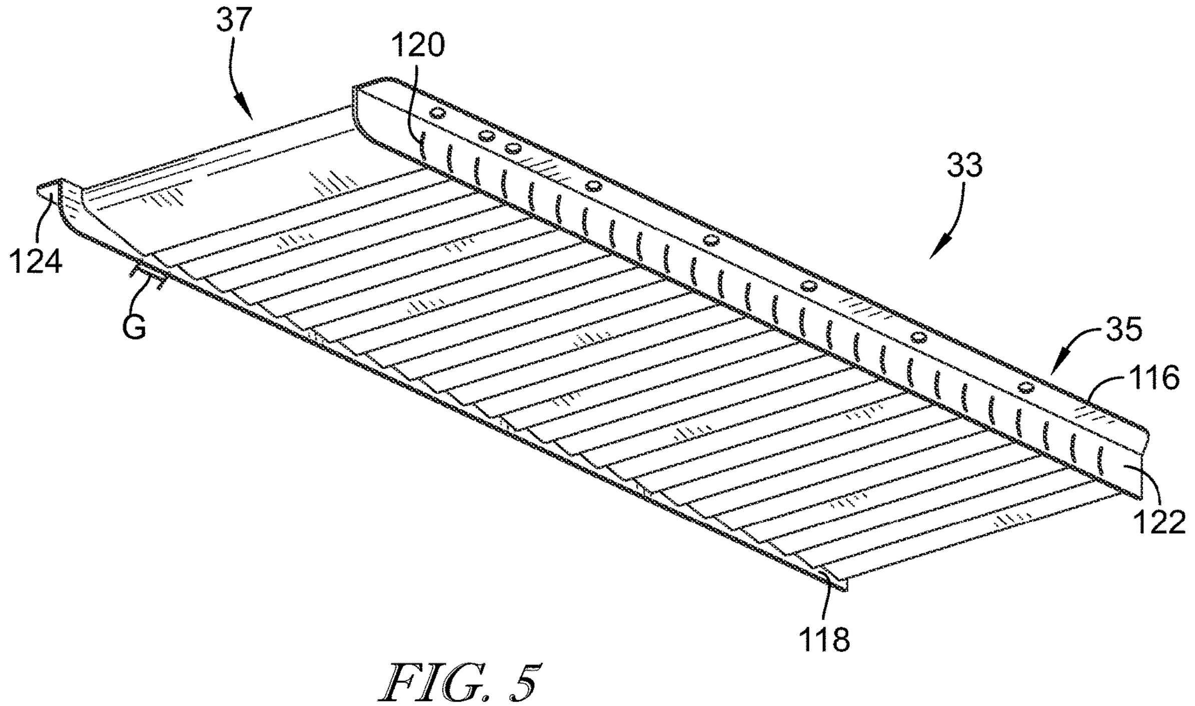
FIG. 5 is a perspective view of the outlet shroud of FIG. 2, showing the outlet shroud includes an outlet vane frame and the plurality of outlet turning vanes coupled with the outlet vane frame and configured to adjust a direction of the flow of air as the air exits the heat exchanger, the outlet vane frame has a first side wall and a second side wall spaced apart from and opposite the first side wall, and each of the plurality of outlet turning vanes extend between the first side wall and the second side wall.

The outlet shroud 33 of the heat-exchanger assembly 26 is coupled downstream of the heat exchanger 30 as shown in FIG. 2. The outlet shroud 33 includes an outlet vane frame 35 and a plurality of outlet turning vanes 37 as shown in FIG. 5. The outlet vane frame 35 is coupled with the outlet side 36 of the heat exchanger 30. The plurality of outlet turning vanes 37 are located within the outlet vane frame 35 and are configured to adjust a direction of the first portion 15A of the air 15 exiting the heat exchanger 30 to minimize pressure losses downstream of the heat-exchanger assembly 26.

Turning back to the inlet shroud 32, the inlet vane frame 38 of the inlet shroud 32 is coupled with the inlet side 34 of the heat exchanger 30 as shown in FIG. 2. The inlet vane frame 38 includes a first side wall 42 and a second side wall 44 spaced apart from and opposite the first side wall 42 in a spanwise direction of the plurality of inlet turning vanes 40. The first side wall 42 and the second side wall 44 of the inlet vane frame 38 are both formed to include a plurality of slots as shown in FIG. 4. The plurality of slots includes a first slot 46 and a second slot 48 neighboring the first slot 46. The first slot 46 has a first chord length C1. The second slot 48 has a second chord length C2. The first chord length C1 is different from the second chord length C2. In the illustrative embodiment, the first chord length C1 is greater than the second chord length C2.

The first slot 46 formed in the first side wall 42 is aligned with the first slot 46 formed in the second side wall 44 as shown in FIG. 4. The second slot 48 formed in the first side wall 42 is aligned with the second slot 48 formed in the second side wall 44. The first side wall 42 and the second side wall 44 are both formed to include additional first slots 46 and additional second slots 48 as shown in FIG. 4. The additional first slots 46 and the additional second slots 48 are arranged in an alternating pattern along the first side wall 42 and the second side wall 44 such that the additional first slots 46 are neighbored on both sides by additional second slots 48.

The inlet vane frame 38 further includes a first flange 50 and a second flange 52 as shown in FIG. 4. The first flange 50 and the second flange 52 couple the inlet vane frame 38 with the inlet side 34 of the heat exchanger 30. The first flange 50 extends outwardly away from the first side wall 42 as shown in FIG. 4. In the illustrative embodiment, the first side wall 42 and the first flange 50 are substantially perpendicular to each other. In illustrative embodiments, the first flange 50 includes a front flange portion and an aft flange portion. In some embodiments, the first flange 50 is formed as a single component extending outwardly away from the first side wall 42. The second flange 52 extends outwardly away from the second side wall 44 as shown in FIG. 4. In the illustrative embodiment, the second side wall 44 and the second flange 52 are substantially perpendicular to each other. In illustrative embodiments, the second flange 52 includes a front flange portion and an aft flange portion. In some embodiments, the second flange 52 is formed as a single component extending outwardly away from the second side wall 44.

The plurality of inlet turning vanes 40 of the inlet shroud 32 are located in and coupled with the inlet vane frame 38 as shown in FIG. 4. In some embodiments, the turning angle of the plurality of inlet turning vanes 40 is between 70 degrees and 75 degrees. In the illustrative embodiment, the turning angle of the plurality of inlet turning vanes 40 is about 72 degrees. The plurality of inlet turning vanes 40 includes a set of first inlet vanes 54 and a set of second inlet vanes 56 alternating and neighboring the first inlet vanes 54. Each of the first inlet vanes 54 are substantially similar and each of the second inlet vanes 56 are substantially similar. As such, only one first inlet vane 54 and one second inlet vane 56 are described below.

Figure 8:
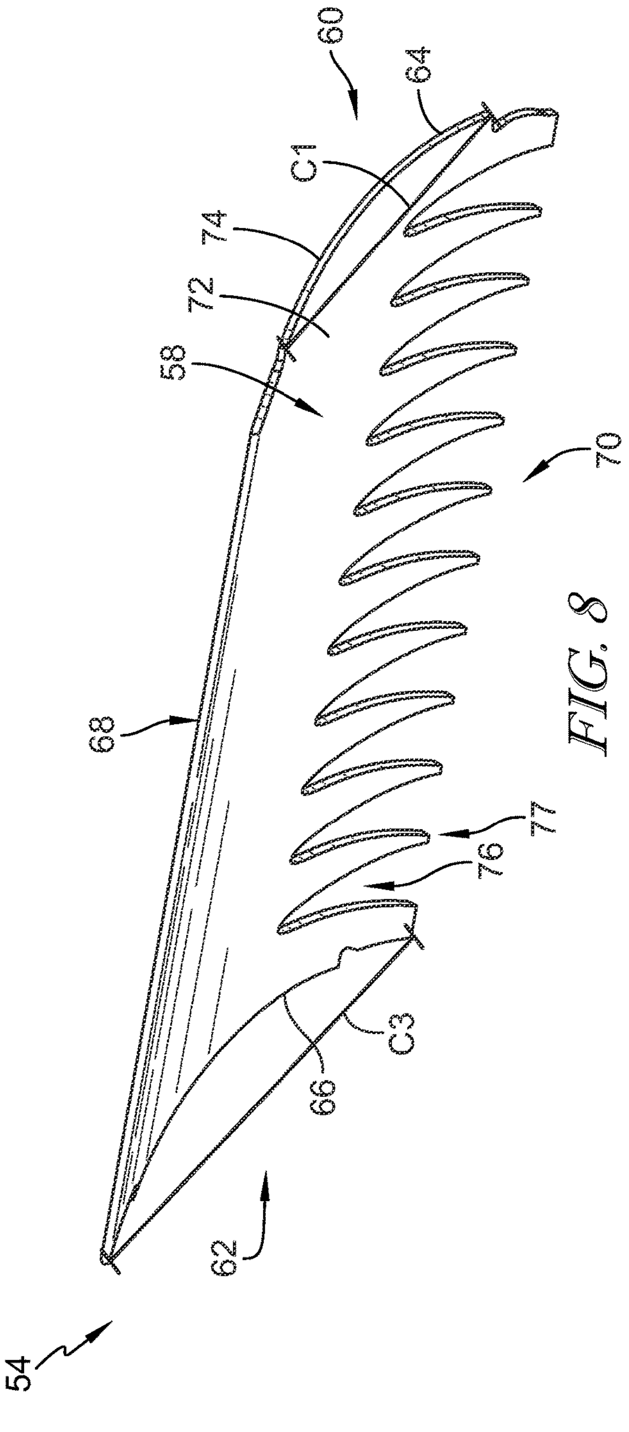
FIG. 8 is an enlarged perspective view of one of the first inlet vanes of FIG. 6, showing the first inlet vane includes a first airfoil body, a first tab extends from a first end of the first airfoil body and is configured to couple with the first side wall of the inlet vane frame shown in FIG. 4, and a second tab extends from a second end of the first airfoil body and is configured to couple with the second side wall of the inlet vane frame.

The first inlet vane 54 includes a first airfoil body 58 having a first end 60 and a second end 62 spaced apart spanwise from the first end 60 as shown in FIG. 8. The first airfoil body 58 has a third chord length C3. The third chord length C3 is greater than the first chord length C1 and the second chord length C2. A first tab 64 extends from the first end 60 of the first airfoil body 58. A second tab 66 extends from the second end 62 of the first airfoil body 58. The first tab 64 and the second tab 66 couple the first inlet vane 54 with the first side wall 42 and the second side wall 44 of the inlet vane frame 38.

The first tab 64 of the first airfoil body 58 of the first inlet vane 54 extends into the first slot 46 of the first side wall 42 as shown in FIG. 4. A chord length of the first tab 64 is substantially similar to the first chord length C1 of the first slot 46 as the first tab 64 fits within the first slot 46 as shown in FIG. 4. The second tab 66 is configured to extend into the first slot 46 of the second side wall 44. A chord length of the second tab 66 is substantially similar to the first chord length C1 of the first slot 46 as the second tab 66 fits within the first slot 46. The chord length of the first tab 64 is substantially similar to the chord length of the second tab 66.

The first inlet vane 54 further includes a leading edge 68, a trailing edge 70, a pressure side 72, and a suction side 74 as shown in FIG. 8. The pressure side 72 of the first inlet vane 54 extends between the leading edge 68 and the trailing edge 70. The suction side 74 extends between the leading edge 68 and the trailing edge 70 on an opposing side of the first inlet vane 54. The trailing edge 70 is spaced apart from the inlet side 34 of the heat exchanger 30 as suggested in FIGS. 2 and 4.

In the illustrative embodiment, the first inlet vane 54 has a substantially continuous thickness from the leading edge 68 to the trailing edge 70. For example, the first inlet vane 54 may be formed from a sheet of material and formed into the curved vane shape without substantially altering the thickness of the sheet. In other embodiments, the first inlet vane 54 has an airfoil shaped cross section.

Figure 10:
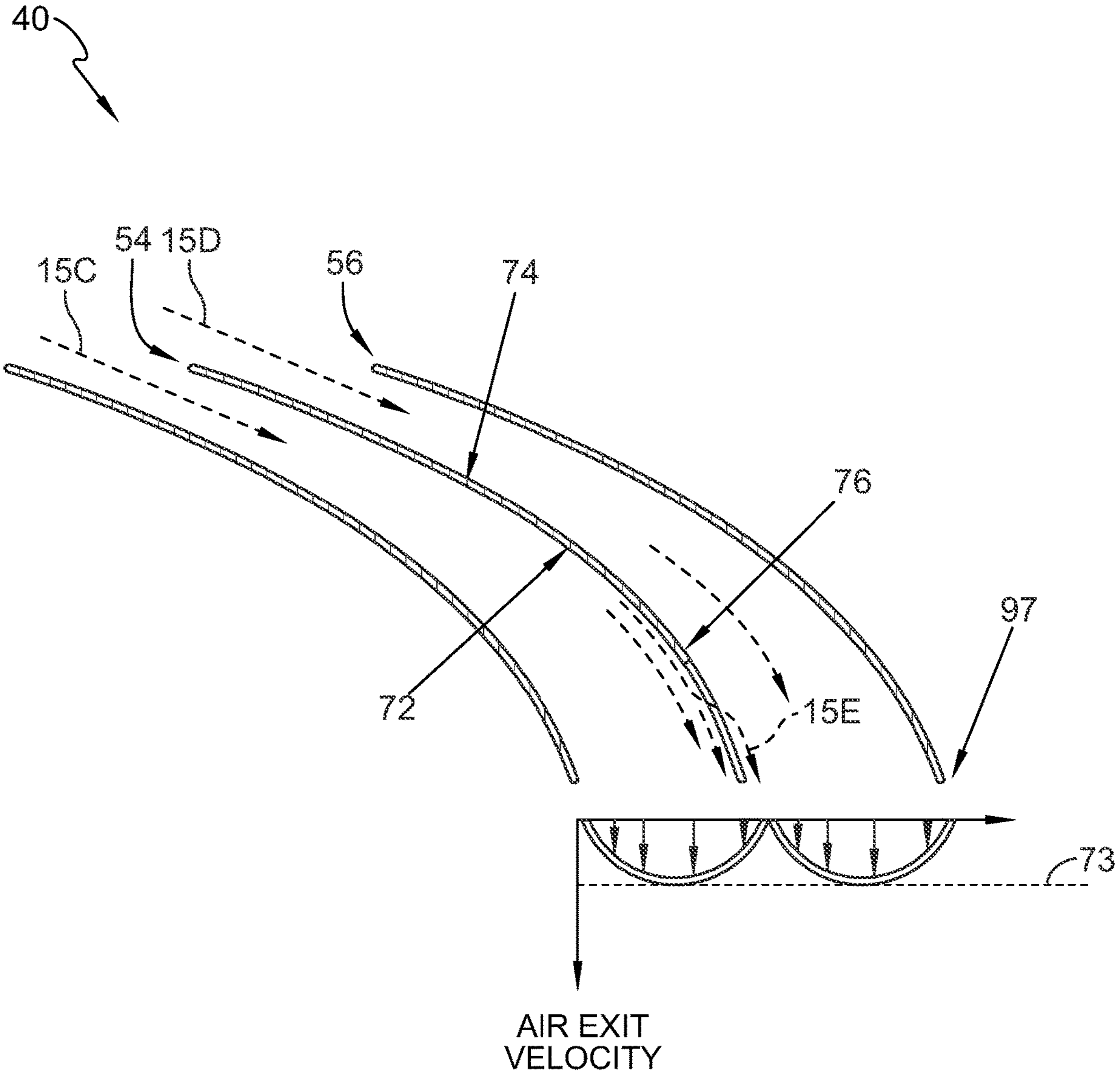
FIG. 10 is a velocity profile of the flow of air through the plurality of inlet turning vanes of FIG. 6, showing that the notches formed in the trailing edge of the first inlet vane and the second inlet vane may increase a uniformity of the velocity profile of the flow of air exiting the inlet shroud and entering the heat exchanger.

Due to size constraints of the bypass duct 20, the plurality of inlet turning vanes 40 may turn the first portion 15A of the air 15 in a relatively short distance. Thus, the first portion 15A of the air 15 may be turned at a relatively large angle by the plurality of inlet turning vanes 40, which have a relatively short chord length. The plurality of inlet turning vanes 40 turn and mix the first portion 15A of the air 15 so that the first portion 15A of the air 15 enters the heat exchanger 30 with a uniform velocity. Separation may occur wherein the first portion 15A of the air 15 separates from the suction side 74, 94 of each of the plurality of inlet turning vanes 40. In some embodiments of the disclosure, the plurality of inlet turning vanes 40 are formed to include notches 76, 96 that improve mixing of the first portion 15A of the air 15, and thus, heat exchanger 30 performance as shown in FIG. 10. The uniform velocity of the first portion 15A of the air 15 as the first portion 15A of the air 15 enters the heat exchanger 30 may increase the heat transfer capability and efficiency of the heat exchanger 30, reduce the total pressure loss through the heat exchanger 30, and minimize heat transfer degradation in the heat exchanger 30.

The trailing edge 70 of the first inlet vane 54 is formed to include first notches 76 that extend into the trailing edge 70 of the first inlet vane 54 partway toward the leading edge 68 of the first inlet vane 54 as shown in FIG. 8. The first notches 76 may increase uniformity of a velocity profile of the first portion 15A of the air 15 exiting the inlet shroud 32 and entering the heat exchanger 30 as suggested in FIG. 10. The first notches 76 are generally chevron shape.

The trailing edge 70 of the first inlet vane 54 is further formed to include first tips 77 between the first notches 76 as shown in FIG. 8. The first tips 77 and the first notches 76 are formed along an entirety of the trailing edge 70 of the first inlet vane 54 in the spanwise direction. In alternative embodiments, the first tips 77 and the first notches 76 are formed along at least part of the trailing edge 70 of the first inlet vane 54 in the spanwise direction.

Figure 9:
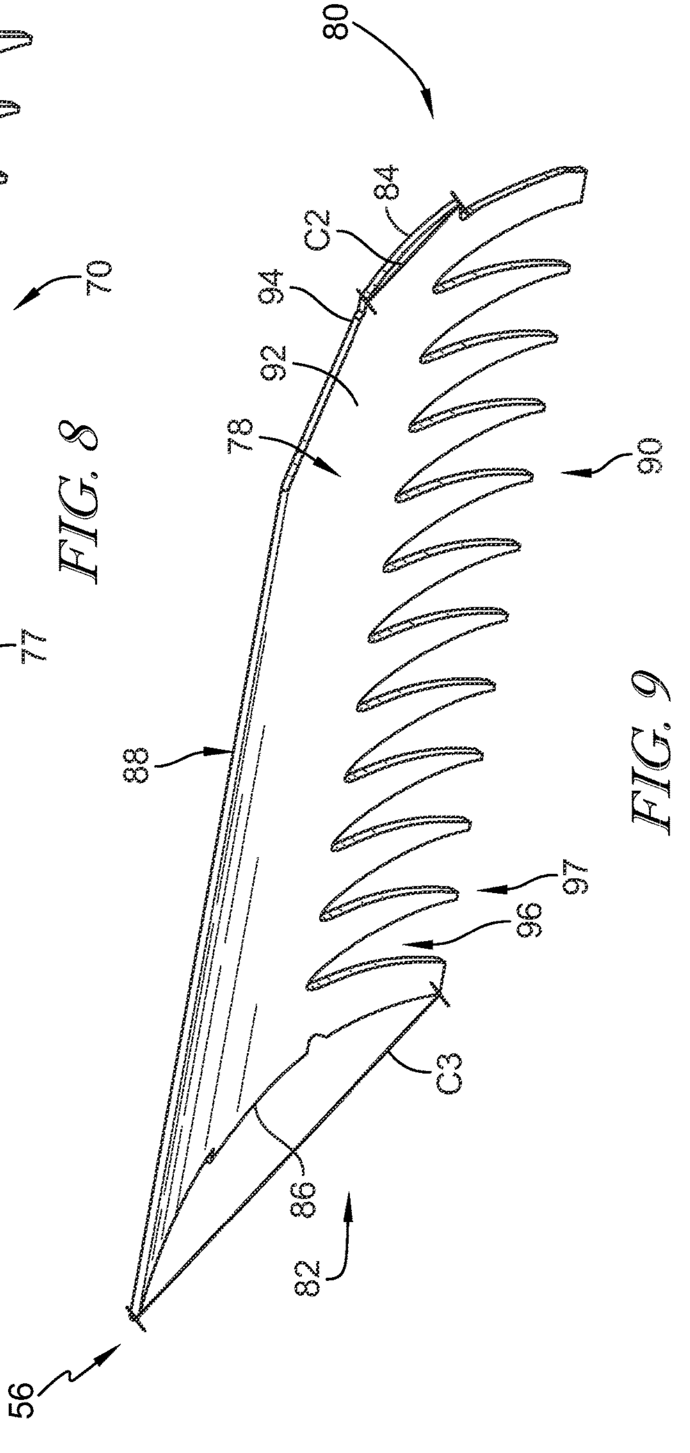
FIG. 9 is an enlarged view of one of the second inlet vanes of FIG. 6, showing the second inlet vane includes a second airfoil body, a third tab extends from a first end of the second airfoil body and is configured to couple with the first side wall of the inlet vane frame shown in FIG. 4, a fourth tab extends from a second end of the second airfoil body and is configured to couple with the second side wall of the inlet vane frame, and the first tab and the second tab of the first inlet vane, as shown in FIG. 8, have a chord length different than a chord length of the third tab and the fourth tab of the second inlet vane as shown in FIG. 9.

The second inlet vane 56 includes a second airfoil body 78 having a first end 80 and a second end 82 spaced apart spanwise from the first end 80 as shown in FIG. 9. The second inlet vane 56 neighbors the first inlet vane 54 in the inlet vane frame 38 as shown in FIG. 4. The second airfoil body 78 has the third chord length C3. Thus, the third chord length C3 of the first airfoil body 58 is the same as the third chord length C3 of the second airfoil body 78. A third tab 84 extends from the first end 80 of the second airfoil body 78. A fourth tab 86 extends from the second end 82 of the second airfoil body 78. The third tab 84 and the fourth tab 86 couple the second inlet vane 56 with the first side wall 42 and the second side wall 44 of the inlet vane frame 38.

The third tab 84 of the second airfoil body 78 of the second inlet vane 56 extends into the second slot 48 of the first side wall 42 as shown in FIG. 4. A chord length of the third tab 84 is substantially similar to the second chord length C2 of the second slot 48 as the third tab 84 fits within the second slot 48. The fourth tab 86 is configured to extend into the second slot 48 of the second side wall 44 as shown in FIG. 4. A chord length of the fourth tab 86 is substantially similar to the second chord length C2 of the second slot 48 as the fourth tab 86 fits within the second slot 48. The chord length of the third tab 84 is substantially similar to the chord length of the fourth tab 86.

The first tab 64 and the second tab 66 of the first inlet vane 54 have a chord length substantially similar to the first chord length C1 of the first slot 46, while the third tab 84 and the fourth tab 86 of the second inlet vane 56 have a chord length substantially similar to the second chord length C2 of the second slot 48. The different tab and slot chord lengths allow the first inlet vane 54 and the second inlet vane 56 to be placed into the inlet vane frame 38 in an alternating order. Because the first slot 46 with the first chord length C1 and the second slot 48 with the second chord length C2 are formed on both the first side wall 42 and the second side wall 44 in an alternating order, the first inlet vane 54 and the second inlet vane 56 are also placed within the inlet vane frame 38 in an alternating order.

Figure 7:
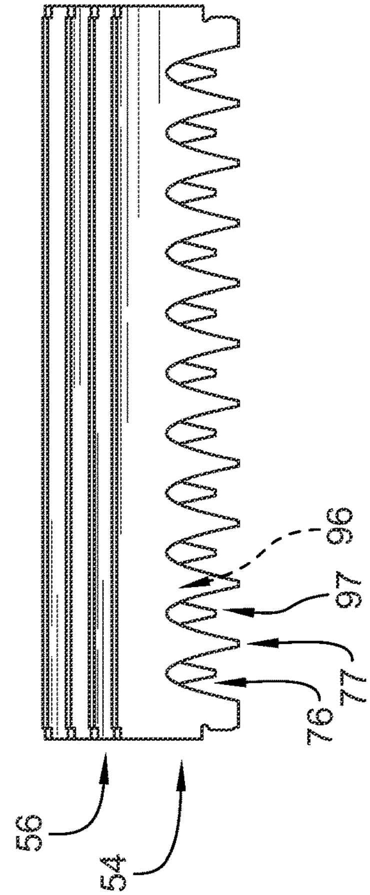
FIG. 7 is an enlarged view of the plurality of inlet turning vanes of FIG. 6, showing the notches formed in the trailing edge of the first inlet vane are offset in a spanwise direction relative to the notches formed in the trailing edge of the second inlet vane.

The first tab 64 and the second tab 66 of the first inlet vane 54 fit within the first slot 46 of the first side wall 42 and the second side wall 44, but do not fit within the second slot 48 of the first side wall 42 and the second side wall 44. Likewise, the third tab 84 and the fourth tab 86 of the second inlet vane 56 fit within the second slot 48 of the first side wall 42 and the second side wall 44, but do not fit within the first slot 46 of the first side wall 42 and the second side wall 44. Thus, the different tab and slot chord lengths allow for proper installation of the first inlet vane 54 and the second inlet vane 56 into the inlet vane frame 38. This may be helpful to maintain the alternating offset of tips 77, 97 as shown in FIG. 7. The first slot 46 and the second slots 48 also help to maintain an airfoil shape of the first airfoil body 58 and the second airfoil body 78, respectively.

In alternative embodiments, the first side wall 42 and the second side wall 44 are formed without slots, and each of the plurality of inlet turning vanes 40 are formed without tabs such that the inlet vane frame 38 and the plurality of inlet turning vanes 40 are integrally formed.

The second inlet vane 56 further includes a leading edge 88, a trailing edge 90, a pressure side 92, and a suction side 94 as shown in FIG. 9. The pressure side 92 of the second inlet vane 56 extends between the leading edge 88 and the trailing edge 90. The suction side 94 extends between the leading edge 88 and the trailing edge 90 on an opposing side of the second inlet vane 56. The trailing edge 90 is spaced apart from the inlet side 34 of the heat exchanger 30. In the illustrative embodiment, the second inlet vane 56 has a substantially continuous thickness from the leading edge 88 to the trailing edge 90. In other embodiments, the second inlet vane 56 has an airfoil shaped cross section.

In the illustrative embodiment, the trailing edge 90 of the second inlet vane 56 is formed to include second notches 96 that extend partway into the trailing edge 90 of the second inlet vane 56 toward the leading edge 88 of the second inlet vane 56 as shown in FIG. 9. The second notches 96 may increase uniformity of the velocity profile of the first portion 15A of the air 15 exiting the inlet shroud 32 and entering the heat exchanger 30 as shown in FIG. 10. The second notches 96 are generally chevron shape.

The shape of the first notches 76 is substantially similar to the shape of the second notches 96 as shown in FIGS. 7-9. In the illustrative embodiment, the shape of both the first notches 76 and the second notches 96 is a chevron shape. In other embodiments, the shape of the first notches 76 and the second notches 96 may be an alternative shape.

The trailing edge 90 of the second inlet vane 56 is further formed to include second tips 97 between the second notches 96 as shown in FIG. 9. The second tips 97 and the second notches 96 are formed along an entirety of the trailing edge 90 of the second inlet vane 56 in the spanwise direction. In alternative embodiments, the second tips 97 and the second notches 96 are formed along at least part of the trailing edge 90 of the second inlet vane 56 in the spanwise direction.

The second notches 96 of the second inlet vane 56 are offset relative to the first notches 76 of the first inlet vane 54 in a spanwise direction of the first inlet vane 54 and the second inlet vane 56 as shown in FIG. 7. The offset pattern, which may also be referred to as a staggered pattern, of the notches 76, 96 promotes further mixing of the first portion 15A of the air 15, in addition to the mixing of the first part 15C of the first portion 15A of the air 15 flowing on the pressure side 72, 92 of each of the plurality of inlet turning vanes 40 and through the notches 76, 96 to mix with the second part 15D of the first portion 15A of the air 15 flowing on the suction side 74, 94 of each of the plurality of inlet turning vanes 40. Thus, the offset pattern of the notches 76, 96 promotes additional mixing of the first portion 15A of the air 15 along a length-wise direction of the heat exchanger 30. The first tips 77 of the first inlet vane 54 are aligned spanwise with the second notches 96 formed in the trailing edge 90 of the second inlet vane 56. The first notches 76 of the first inlet vane 54 are aligned spanwise with the second tips 97 formed in the trailing edge 90 of the second inlet vane 56.

The first portion 15A of the air 15 flowing through the flow path 24 of the bypass duct 20 enters the inlet shroud 32 as shown in FIG. 2. A first part 15C of the first portion 15A of the air 15 flows on the pressure side 72 of the first inlet vane 54 and a second part 15D flows on the suction side 74 of the first inlet vane 54 (and on the pressure side 92 of the second inlet vane 56) as suggested in FIG. 10. A portion 15E of the first part 15C of the air 15 flowing on the pressure side 72 of the first inlet vane 54 flows through the first notches 76 formed on the trailing edge 70 of the first inlet vane 54. The portion 15E of the first part 15C mixes with the second part 15D of the air 15 flowing on the suction side 74 of the first inlet vane 54.

The mixing of the portion 15E of the air 15 from the pressure side 72 with the second part 15D of the air 15 from the suction side 74 of the first inlet vane 54 may increase the uniformity of the velocity profile of the first portion 15A of the air 15 exiting the inlet shroud 32 and entering the heat exchanger 30 as suggested in FIG. 10. In particular, a peak 73 of the velocity profile may be relatively lower and closer to an average velocity of the first portion 15A of the air 15. Additionally, the notches 76, 96 may reduce or eliminate areas of reverse flow as suggested in FIG. 10.

At the first tips 77 of the first inlet vane 54, another portion of the first part 15C of the air 15 flowing on the pressure side 72 of the first inlet vane 54 flows along the first tips 77. Thus, the first and second notches 76, 96 of the first and second inlet vanes 54, 56 maintain the uniform flow of the first portion 15A of the air 15, which may increase the heat transfer capability of the heat exchanger 30, reduce total pressure loss through the heat exchanger 30, and minimize heat transfer degradation in the heat exchanger 30.

Figure 6:
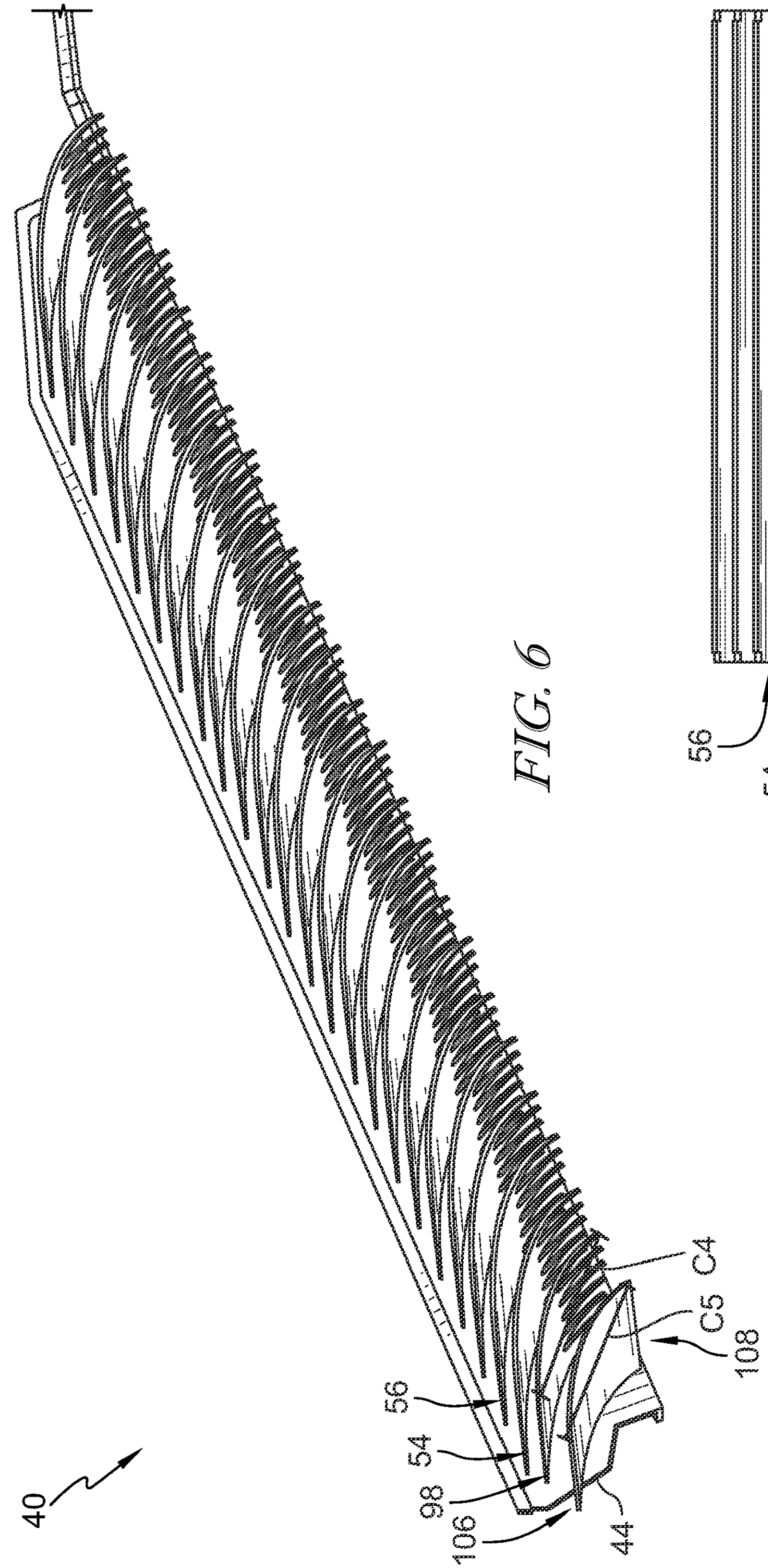
FIG. 6 is a perspective view of a portion of the inlet shroud of FIG. 4 with the first side wall of the inlet vane frame removed, showing the plurality of inlet turning vanes includes a first inlet vane and a second inlet vane, the first and second inlet vanes each have a leading edge and a trailing edge, the trailing edge is formed to include notches that extend into the trailing edge toward the leading edge, and the plurality of inlet turning vanes further includes a third inlet vane having a leading edge and a trailing edge formed as a continuous trailing edge without notches.

The plurality of inlet turning vanes 40 further includes a third inlet vane 98 located as the second axially forwardmost inlet turning vane 40 as shown in FIGS. 4 and 6. The third inlet vane 98 has a fourth chord length C4 that is less than the third chord length C3 of the first inlet vane 54 and the second inlet vane 56 due to the profile of incoming air and the space claim in the bypass duct 20. The third inlet vane 98 neighbors the first inlet vane 54 to locate the first inlet vane 54 directly between the third inlet vane 98 and the second inlet vane 56. The third inlet vane 98 has a first end coupled to the first side wall 42 and a second end coupled to the second side wall 44 as shown in FIG. 4.

The trailing edge of the third inlet vane 98 is formed to include third notches 102 that extend into the trailing edge of the third inlet vane 98 toward the leading edge of the third inlet vane 98 as shown in FIGS. 4 and 6. The trailing edge of the third inlet vane 98 is further formed to include third tips 104 that define the third notches 102 as shown in FIG. 4. The third notches 102 of the third inlet vane 98 are offset relative to the first notches 76 of the first inlet vane 54 in a spanwise direction. The third notches 102 of the third inlet vane 98 are aligned with the second notches 96 of the second inlet vane 56. The third tips 104 of the third inlet vane 98 are aligned spanwise with the first notches 76 of the first inlet vane 54. In the illustrative embodiment, the notches 76, 96 and the notches 76, 102 are offset in the spanwise direction by a distance substantially equal to half of the notch pitch spacing. The trailing edge of the third inlet vane 98 is spaced apart from the inlet side 34 of the heat exchanger 30 as suggested in FIGS. 2 and 4.

The plurality of inlet turning vanes 40 further includes a fourth inlet vane 106 as shown in FIGS. 4 and 6. The fourth inlet vane 106 neighbors the third inlet vane 98 to locate the third inlet vane 98 directly between the fourth inlet vane 106 and the first inlet vane 54. In the illustrative embodiment, the fourth inlet vane 106 is the axially forwardmost vane of the plurality of inlet turning vanes 40 located in the inlet vane frame 38 as shown in FIG. 4.

A trailing edge 108 of the fourth inlet vane 106 is formed as a continuous trailing edge 108 without notches. The continuous trailing edge 108 of the axially forwardmost fourth inlet vane 106 directs the first portion 15A of the air 15 into the heat exchanger 30, instead of in front of the heat exchanger 30, which might create a recirculation zone. The fourth inlet vane 106 has a fifth chord length C5 that is smaller than the fourth chord length C4 in the illustrative embodiment. The trailing edge 108 is spaced apart from the inlet side 34 of the heat exchanger 30. In the illustrative embodiment, the trailing edge of each of the plurality of inlet turning vanes 40 is spaced apart from the inlet side 34 of the heat exchanger 30.

The shroud housing 41 of the inlet shroud 32 is arranged around the first side wall 42 and the second side wall 44 of the inlet vane frame 38 as shown in FIG. 4. The shroud housing 41 includes a first wall 110, a second wall 112, and a third wall 114 as shown in FIG. 4. The first wall 110 and the second wall 112 are spaced apart circumferentially from one another. The third wall 114 extends circumferentially between and interconnects the first wall 110 and the second wall 112. The third wall 114 is radially aligned with the outer wall 19 of the bypass duct 20 as shown in FIG. 2.

The first wall 110 of the shroud housing 41 is coupled with the first side wall 42 of the inlet vane frame 38 as shown in FIG. 4. The second wall 112 of the shroud housing 41 is coupled with the second side wall 44 of the inlet vane frame 38. The third wall 114 extends radially outward away from the heat exchanger 30 and collects the first portion 15A of the air 15 so that the first portion 15A flows through the heat exchanger 30.

The shroud housing 41 and the inlet vane frame 38 cooperate to direct the first portion 15A of the air 15 through the plurality of inlet turning vanes 40, and thus, the heat exchanger 30, while also diverting the second portion 15B of the air 15 circumferentially around the heat-exchanger assembly 26.

Turning back to the outlet shroud 33, the outlet vane frame 35 includes a first side wall 116 and a second side wall 118 spaced apart from and opposite the first side wall 116 in a spanwise direction of the plurality of outlet turning vanes 37 as shown in FIG. 5. The first side wall 116 and the second side wall 118 block the first portion 15A of the air 15 from flowing circumferentially out of the outlet shroud 33 prior to flowing through the plurality of outlet turning vanes 37, which prevents the first portion 15A from mixing with the second portion 15B before the first portion 15A of the air 15 is turned so that it flows substantially parallel with the second portion 15B of the air 15.

In one embodiment, the first side wall 116 and the second side wall 118 of the outlet vane frame 35 are both formed to include a plurality of slots 120 similar to the first slots 46 or the second slots 48 formed in the inlet vane frame 38. In another embodiment, the first side wall 116 and the second side wall 118 of the outlet vane frame 35 are both formed without slots such that the outlet vane frame 35 and the plurality of outlet turning vanes 37 are integrally formed.

The outlet vane frame 35 further includes a first flange 122 and a second flange 124 as shown in FIG. 5. The first flange 122 and the second flange 124 couple the outlet vane frame 35 with the outlet side 36 of the heat exchanger 30. The first flange 122 extends outwardly away from the first side wall 116. In the illustrative embodiment, the first side wall 116 and the first flange 122 are substantially perpendicular to each other. In illustrative embodiments, the first flange 122 includes a front flange portion and an aft flange portion. In some embodiments, the first flange 122 is formed as a single component extending outwardly away from the first side wall 116. The second flange 124 extends outwardly away from the second side wall 118 as shown in FIG. 5. In the illustrative embodiment, the second side wall 118 and the second flange 124 are substantially perpendicular to each other. In illustrative embodiments, the second flange 124 includes a front flange portion and an aft flange portion. In some embodiments, the second flange 124 is formed as a single component extending outwardly away from the second side wall 118.

The plurality of outlet turning vanes 37 are located in and coupled with the outlet vane frame 35 and are configured to adjust a direction of the first portion 15A of the air 15 exiting the heat exchanger 30 as shown in FIG. 2. The plurality of outlet turning vanes 37 turn the first portion 15A of air 15 by adjusting a direction of the first portion 15A of the air 15 such that the first portion 15A of the air 15 exits the heat exchanger 30 and flows primarily axially aft and substantially parallel to the central axis 11 in the illustrative embodiment.

Figure 11:
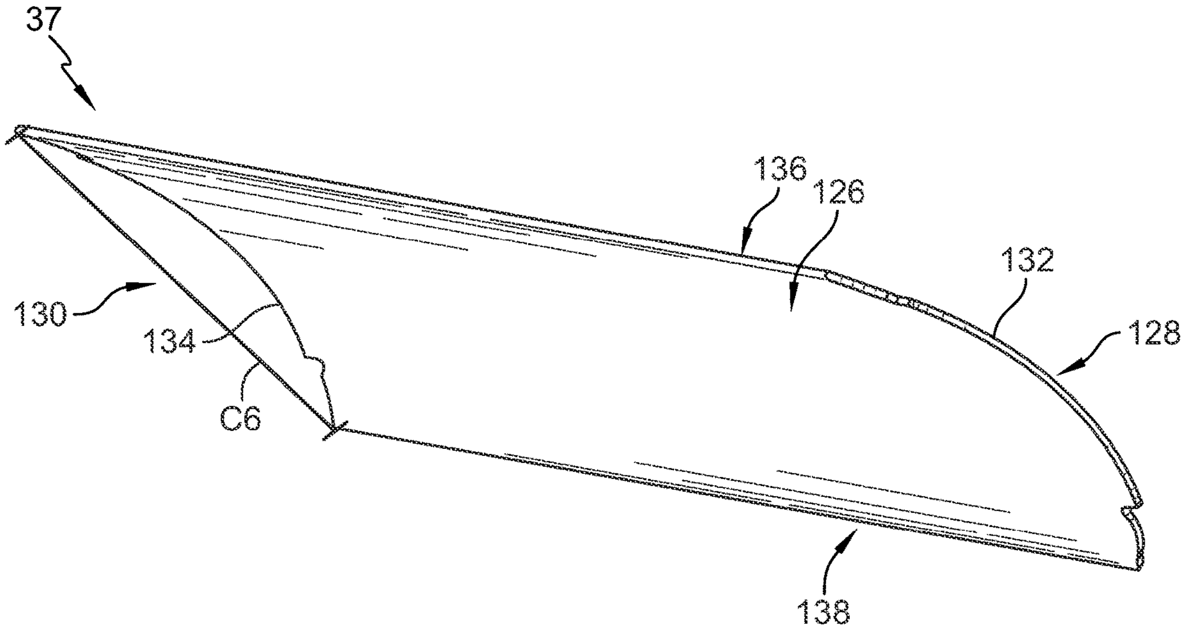
FIG. 11 is a perspective view of an outlet turning vane of the plurality of outlet turning vanes of FIG. 5, showing the outlet turning vane has a leading edge and a trailing edge formed as a continuous trailing edge.

Each of the plurality of outlet turning vanes 37 includes an airfoil body 126 having a first end 128 and a second end 130 spaced apart spanwise from the first end 128 as shown in FIG. 11. The airfoil body 126 of each of the plurality of outlet turning vanes 37 has a sixth chord length C6. The sixth chord length C6 of each of the plurality of outlet turning vanes 37 is less than the third chord length C3 of the first and second inlet vanes 54, 56. A first tab 132 extends from the first end 128 of the airfoil body 126. A second tab 134 extends from the second end 130 of the airfoil body 126. The first tab 132 and the second tab 134 couple each of the plurality of outlet turning vanes 37 with the first side wall 116 and the second side wall 118 of the outlet vane frame 35.

Each of the plurality of outlet turning vanes 37 further includes a leading edge 136 and a trailing edge 138 as shown in FIG. 11. The trailing edge 138 of each of the plurality of outlet turning vanes 37 is formed as a continuous trailing edge 138. The trailing edge 138 of each of the plurality of outlet turning vanes 37 is spaced apart from the outlet side 36 of the heat exchanger 30 as suggested in FIGS. 2 and 5. Because there are no notches formed in the trailing edges 138 that require offsetting like the notches 76, 96 of the first and second inlet vanes 54, 56, the plurality of slots 120 formed on the first side wall 116 and the second side wall 118 of the outlet vane frame 35 are substantially similar to one another.

In the illustrative embodiment, each of the plurality of outlet turning vanes 37 has a substantially continuous thickness from leading edge 136 to trailing edge 138. For example, each of the plurality of outlet turning vanes 37 may be formed from a sheet of material and formed into the curved vane shape without substantially altering the thickness of the sheet. In other embodiments, each of the plurality of outlet turning vanes 37 has an airfoil shaped cross section.

Due to the angled position of the heat exchanger 30 within the bypass duct 20, the plurality of outlet turning vanes 37 turn and accelerate the first portion 15A of the air 15 as it exits the heat exchanger 30 so that the first portion 15A of the air 15 flows substantially parallel to the central axis 11. The direction of the first portion 15A of the air 15 as the first portion 15A exits the heat exchanger 30 may reduce mixing losses when the first portion 15A of the air 15 and the second portion 15B of the air 15 mix downstream of the heat-exchanger assembly 26. By flowing substantially parallel to the central axis 11, the first portion 15A of the air 15 also flows substantially parallel to the second portion 15B of the air 15 that bypassed the heat-exchanger assembly 26 as shown in FIG. 3. Because the first portion 15A and the second portion 15B flow substantially parallel to one another downstream of the heat-exchanger assembly 26, the first portion 15A and the second portion 15B merge and mix with one another without the first portion 15A flowing at an angle directly into the second portion 15B. If the first portion 15A of the air 15 is not turned so that it flows substantially parallel with the central axis 11, there may be pressure losses downstream of the heat-exchanger assembly 26 when the first portion 15A and the second portion 15B of the air 15 collide.

Further, the plurality of outlet turning vanes 37 turn and direct the first portion 15A of the air 15 primarily axially aft such that the first portion 15A of the air 15 does not flow directly into the inner wall 23 of the bypass duct 20 as shown in FIG. 2. If the first portion 15A of the air 15 flows directly into the inner wall 23, which may be an engine case, localized cooling of the inner wall 23 may occur. Localized cooling may cause the inner wall 23, or the engine case, to deform, which may cause issues with rotating components located radially inward of the inner wall 23. Thus, the plurality of outlet turning vanes 37 help to provide a more uniform circumferential temperature of the inner wall 23.

A gap G between neighboring trailing edges 138 of the plurality of outlet turning vanes 37 can be altered to control an outlet flow area of the outlet shroud 33 so that an amount of the first portion 15A of the air 15 that flows through the heat-exchanger assembly 26 and an amount of the second portion 15B of the air 15 that bypasses the heat-exchanger assembly 26 is controlled. Thus, the amount of cooling in the heat exchanger 30 can be altered without changing the general heat exchanger 30 design. For example, the gap G between each trailing edge 138 can be decreased for applications that require less heat transfer or less air flow through the heat exchanger 30. In some embodiments, the gap G may be measured between different parts of neighboring outlet turning vanes 37 such that the gap G is not measured between neighboring trailing edges 138. The gap G may be measured between two points on neighboring outlet turning vanes 37 corresponding to the location of a minimum flow area between the neighboring outlet turning vanes 37.

Figure 12:
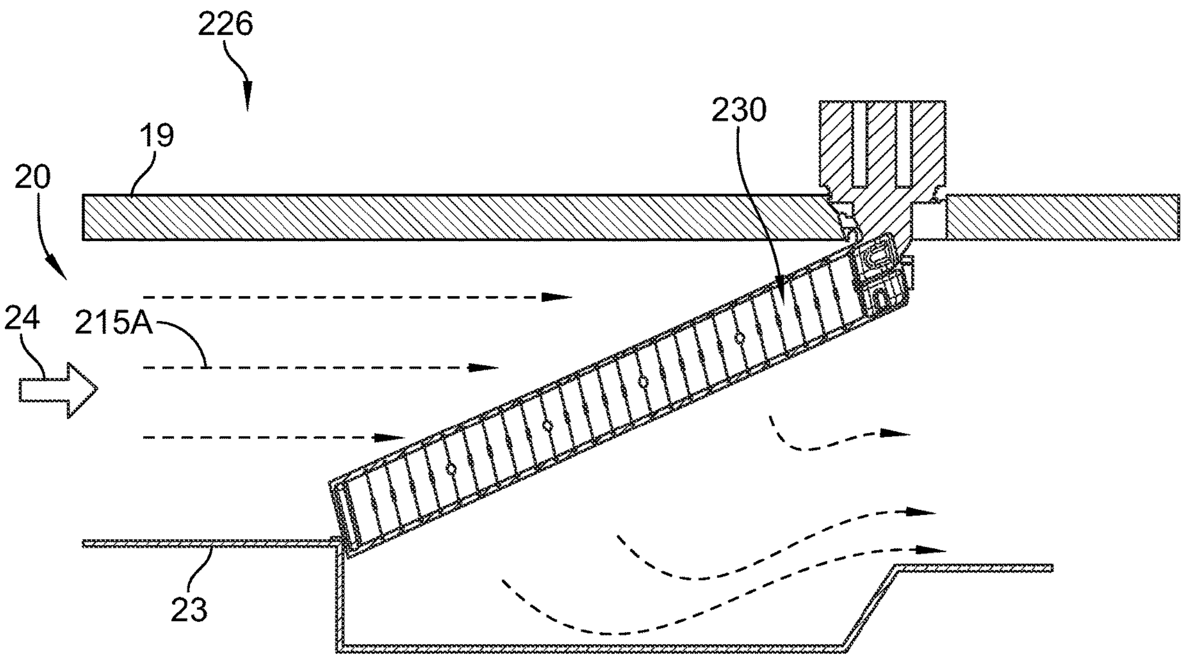
FIG. 12 is a section view of a bypass duct with another embodiment of a heat-exchanger assembly arranged in the bypass duct, showing the heat-exchanger assembly of FIG. 12 does not include an inlet shroud coupled upstream of a heat exchanger and does not include an outlet shroud coupled downstream of the heat exchanger such that the flow of air exiting the heat exchanger is directed axially aft and radially inwardly in some embodiments.

Another embodiment of a heat-exchanger assembly 226 in accordance with the present disclosure is shown in FIG. 12. The heat-exchanger assembly 226 is substantially similar to the heat-exchanger assembly 26 shown in FIGS. 2-11 and described herein. Accordingly, similar reference numbers in the 200 series indicate features that are common between the heat-exchanger assembly 26 and the heat-exchanger assembly 226. The description of the heat-exchanger assembly 26 is incorporated by reference to apply to the heat-exchanger assembly 226, except in instances when it conflicts with the specific description and the drawings of the heat-exchanger assembly 226.

The heat-exchanger assembly 226 is similar to the heat-exchanger assembly 26 expect that the heat-exchanger assembly 226 does not include an inlet shroud or an outlet shroud. Thus, the heat-exchanger assembly 226 includes a heat exchanger 230 arranged in the bypass duct 20 at an angle relative to the central axis 11. A first portion 215A of the air flowing through the bypass duct 20 enters the heat exchanger 230 at an angle instead of entering the heat exchanger 230 orthogonally. As the first portion 215A of the air exits the heat exchanger 230, some of the first portion 215A of the air may flow axially aft and radially inwardly toward the inner wall 23 of the bypass duct 20.

A method of using the bypass duct 20 and the heat-exchanger assembly 26 is described below. The method includes arranging the bypass duct 20 circumferentially around the central axis 11 of the gas turbine engine 10. The bypass duct 20 includes the outer wall 19 that defines an outer boundary of the flow path 24 and the inner wall 23 that defines an inner boundary of the flow path 24.

The method includes arranging the heat exchanger 30 in the bypass duct 20 at an angle relative to the central axis 11 of the gas turbine engine 10 so that the heat exchanger 30 extends entirely radially between the outer wall 19 and the inner wall 23 of the bypass duct 20. The heat exchanger 30 has the inlet side 34 and the outlet side 36 spaced apart from and opposite the inlet side 34.

The method includes providing the inlet shroud 32 having the inlet vane frame 38 and the plurality of inlet turning vanes 40 coupled with the inlet vane frame 38. The inlet vane frame 38 has the first side wall 42, the second side wall 44 spaced apart from the first side wall 42 in a spanwise direction of the plurality of inlet turning vanes 40, and the shroud housing 41 extending between the first side wall 42 and the second side wall 44 and outwardly away from the heat exchanger 30.

The method includes coupling the inlet vane frame 38 of the inlet shroud 32 with the inlet side 34 of the heat exchanger 30 in the bypass duct 20. The method further includes providing the outlet shroud 33 having the outlet vane frame 35 and the plurality of outlet turning vanes 37 coupled with the outlet vane frame 35. The outlet vane frame 35 has the first side wall 116 and a second side wall 118 spaced apart from the first side wall 116 in a spanwise direction of the plurality of outlet turning vanes 37.

The method includes coupling the outlet vane frame 35 with the outlet side 36 of the heat exchanger 30 in the bypass duct 20. The method further includes flowing air 15 through the flow path 24 of the bypass duct 20. The method further includes collecting the first portion 15A of the air 15 with the shroud housing 41 of the inlet shroud 32 and diverting the second portion 15B of the air 15 around the inlet shroud 32. The method includes adjusting a direction of the first portion 15A of the air 15 with plurality of inlet turning vanes 40 before the first portion 15A of the air 15 enters the heat exchanger 30. The method includes adjusting the direction of the first portion 15A of the air 15 with the plurality of outlet turning vanes 37 after the first portion 15A of the air 15 exits the heat exchanger 30 so that the first portion 15A of the air 15 flows substantially parallel to the central axis 11. The method includes mixing the first portion 15A of the air 15 and the second portion 15B of the air 15 downstream of the outlet shroud 33.

Each of the plurality of inlet turning vanes 40 includes the leading edge 68, 88 and the trailing edge 70, 90, 108 opposite the leading edge 68, 88, and the trailing edge 70, 90, 108 of each of the plurality of inlet turning vanes 40 is spaced apart from the inlet side 34 of the heat exchanger 30. Each of the plurality of outlet turning vanes 37 includes the leading edge 136 and the trailing edge 138 opposite the leading edge 136, and the trailing edge 138 of each of the plurality of outlet turning vanes 37 is spaced apart from the outlet side 36 of the heat exchanger 30. In some embodiments, the method includes adjusting the gap G between neighboring trailing edges 138 of the plurality of outlet turning vanes 37 to control an outlet flow area of the outlet shroud 33 so that an amount of the first portion 15A of the air 15 that flows through the inlet shroud 32 and an amount of the second portion 15B of the air 15 that bypasses the inlet shroud 32 is modulated.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:

a bypass duct configured to direct air through a flow path to provide thrust to propel the gas turbine engine, the bypass duct arranged circumferentially around a central axis of the gas turbine engine and including an outer wall that defines an outer boundary of the flow path and an inner wall that defines an inner boundary of the flow path, the air being discharged from the flow path of the bypass duct through an outlet of the bypass duct that defines a terminal end of a fan section of the gas turbine engine, and a heat-exchanger assembly configured to receive a first portion of the air flowing through the flow path of the bypass duct and to divert a second portion of the air flowing through the flow path around the heat-exchanger assembly, the heat-exchanger assembly extending entirely radially between the outer wall and the inner wall of the bypass duct so that the heat-exchanger assembly abuts each of the outer wall and the inner wall, the heat-exchanger assembly including:

a heat exchanger configured to transfer heat from a fluid to be cooled passing through the heat exchanger to the first portion of the air, the heat exchanger arranged in the bypass duct at an angle relative to the central axis of the gas turbine engine, and the heat exchanger having an inlet side and an outlet side spaced apart from and opposite the inlet side, an inlet shroud configured to change a direction of the first portion of the air flowing through the flow path toward the heat exchanger, the inlet shroud including an inlet vane frame coupled with the inlet side of the heat exchanger and a plurality of inlet turning vanes coupled with the inlet vane frame and configured to turn and direct the first portion of the air into the heat exchanger, and an outlet shroud configured to change the direction of the first portion of the air flowing out of the heat exchanger, the outlet shroud including an outlet vane frame coupled with the outlet side of the heat exchanger and a plurality of outlet turning vanes coupled with the outlet vane frame and configured to turn and accelerate the first portion of the air exiting the heat exchanger so that the first portion of the air flows substantially parallel to the central axis to minimize concentrated cooling on the inner wall of the bypass duct and to minimize mixing losses downstream of the heat-exchanger assembly, wherein each of the plurality of inlet turning vanes includes a leading edge and a trailing edge opposite the leading edge of a respective inlet turning vane, and the trailing edge of each of the plurality of inlet turning vanes is formed to include notches that extend into the trailing edge toward the leading edge to increase uniformity of a velocity profile of the first portion of the air exiting the inlet shroud and entering the heat exchanger, wherein each of the plurality of outlet turning vanes includes a leading edge and a trailing edge opposite the leading edge of a respective outlet turning vane, and the trailing edge of each of the plurality of outlet turning vanes is formed as a continuous trailing edge without notches.

2. The gas turbine engine of claim 1, wherein the trailing edge of each of the plurality of inlet turning vanes is spaced apart from the inlet side of the heat exchanger.

3. The gas turbine engine of claim 1, wherein the trailing edge of each of the plurality of outlet turning vanes is spaced apart from the outlet side of the heat exchanger.

4. The gas turbine engine of claim 1, wherein a gap between neighboring trailing edges of the plurality of outlet turning vanes is adapted to control an outlet flow area of the outlet shroud so that an amount of the first portion of the air that flows through the heat-exchanger assembly and an amount of the second portion of the air that bypasses the heat-exchanger assembly is modulated.

5. The gas turbine engine of claim 1, wherein the inlet vane frame includes a first side wall, a second side wall spaced apart from the first side wall in a spanwise direction of the plurality of inlet turning vanes, and a shroud housing extending between the first side wall and the second side wall and outwardly away from the heat exchanger, the plurality of inlet turning vanes are coupled to and extend between the first side wall and the second side wall of the inlet vane frame, and the shroud housing collects the first portion of the air and directs the first portion of the air into the inlet vane frame.

6. The gas turbine engine of claim 1, wherein the outlet vane frame includes a first side wall and a second side wall spaced apart from the first side wall in a spanwise direction of the plurality of outlet turning vanes, and the plurality of outlet turning vanes are coupled to and extend between the first side wall and the second side wall of the outlet vane frame.

7. The gas turbine engine of claim 6, wherein the outlet vane frame includes a first flange extending outwardly from the first side wall and a second flange extending outwardly from the second side wall, and wherein the first flange and the second flange are coupled with the outlet side of the heat exchanger.

8. The gas turbine engine of claim 1, wherein the inlet vane frame includes a first side wall, a second side wall spaced apart from and opposite the first side wall in a spanwise direction of the plurality of inlet turning vanes, a first flange extending outwardly from the first side wall, and a second flange extending outwardly from the second side wall, and wherein the first flange and the second flange are coupled with the inlet side of the heat exchanger.

9. The gas turbine engine of claim 8, wherein the first side wall and the second side wall of the inlet vane frame are both formed to include a plurality of slots, and each of the plurality of inlet turning vanes includes an airfoil body, a first tab extending from a first end of the airfoil body and into one of the plurality of slots of the first side wall of the inlet vane frame, and a second tab extending from a second end of the airfoil body and into one of the plurality of slots of the second side wall of the inlet vane frame.

10. The gas turbine engine of claim 1, wherein the inlet shroud further includes an axially forwardmost vane coupled with the inlet vane frame and configured to turn and direct the first portion of the air into the heat exchanger, the axially forwardmost vane includes a leading edge and a trailing edge opposite the leading edge of the axially forwardmost vane, and wherein the trailing edge of the axially forwardmost vane is formed as a continuous trailing edge without notches.

11. The gas turbine engine of claim 1, wherein the inner wall of the bypass duct includes a first segment that extends parallel to the central axis, a second segment coupled to the first segment and extending radially inwardly therefrom perpendicular to the central axis, and a third segment coupled to the second segment and extending axially aft therefrom and parallel to the central axis.

12. A heat-exchanger assembly adapted for use with a gas turbine engine, the heat-exchanger assembly comprising:

a bypass duct configured to direct a flow of air through a flow path, the bypass duct including an outer wall that defines an outer boundary of the flow path and an inner wall that defines an inner boundary of the flow path, the flow of air being discharged from the flow path of the bypass duct through an outlet of the bypass duct that defines a terminal end of a fan section of the gas turbine engine, a heat exchanger arranged in the bypass duct and configured to receive a portion of the flow of air and to transfer heat from a cooling fluid to the portion of the flow of air, the heat exchanger having an inlet side configured to receive the portion of the flow of air and an outlet side spaced apart from and opposite the inlet side and configured to direct the portion of the flow of air out of the heat exchanger, an inlet shroud including an inlet vane frame located upstream of the inlet side of the heat exchanger and a plurality of inlet turning vanes coupled with the inlet vane frame, the inlet vane frame includes a first side wall, a second side wall spaced apart from the first side wall in a spanwise direction of the plurality of inlet turning vanes, a shroud housing that extends between the first side wall and the second side wall and outwardly away from the heat exchanger, a first flange extending outwardly from the first side wall of the inlet vane frame, and a second flange extending outwardly from the second side wall of the inlet vane frame and spaced apart from the first flange to locate the first side wall, the second side wall, and the plurality of inlet turning vanes circumferentially therebetween, the first flange and the second flange are coupled with the inlet side of the heat exchanger, the shroud housing collects the portion of the flow of air and directs the portion of the flow of air into the inlet vane frame, and the plurality of inlet turning vanes extend between the first side wall and the second side wall and are configured to turn and direct the portion of the flow of air toward the heat exchanger, and an outlet shroud including an outlet vane frame located downstream of the outlet side of the heat exchanger and a plurality of outlet turning vanes coupled with the outlet vane frame and configured to turn and accelerate the portion of the flow of air exiting the heat exchanger, the outlet vane frame includes a first side wall, a second side wall spaced apart from the first side wall of the outlet vane frame in a spanwise direction of the plurality of outlet turning vanes, a first flange extending outwardly from the first side wall of the outlet vane frame, and a second flange extending outwardly from the second side wall of the outlet vane frame and spaced apart from the first flange of the outlet vane frame to locate the first side wall, the second side wall, and the plurality of outlet turning vanes circumferentially therebetween, the plurality of outlet turning vanes are coupled to and extend between the first side wall and the second sidewall of the outlet vane frame, and the first flange and the second flange of the outlet vane frame are coupled with the outlet side of the heat exchanger, wherein the portion of the flow of air flows into the shroud housing in a first direction prior to flowing through the plurality of inlet turning vanes, the plurality of inlet turning vanes turn the portion of the flow of air radially inwardly toward the heat exchanger so that the portion of the flow of air flows orthogonally into the inlet side of the heat exchanger in a second direction different than the first direction, and the plurality of outlet turning vanes turn the portion of the flow of air so that the portion of the flow of air flows in the first direction as the portion of the flow of air exits the plurality of outlet turning vanes, wherein each of the plurality of inlet turning vanes includes a leading edge and a trailing edge opposite the leading edge of a respective inlet turning vane, and the trailing edge of each of the plurality of inlet turning vanes is formed to include notches that extend into the trailing edge toward the leading edge to increase uniformity of a velocity profile of the portion of air exiting the inlet shroud and entering the heat exchanger, wherein each of the plurality of outlet turning vanes includes a leading edge and a trailing edge opposite the leading edge of a respective outlet turning vane, and the trailing edge of each of the plurality of outlet turning vanes is formed as a continuous trailing edge without notches.

13. The heat-exchanger assembly of claim 12, wherein each of the plurality of inlet turning vanes has a first chord length, each of the plurality of outlet turning vanes has a second chord length, and the first chord length is greater than the second chord length.

14. The heat-exchanger assembly of claim 12, wherein a gap between neighboring trailing edges of the plurality of outlet turning vanes is adapted to control an outlet flow area of the outlet shroud so that an amount of the portion of the flow of air that flows through the heat exchanger is modulated.

15. The heat-exchanger assembly of claim 12, wherein each of the plurality of inlet turning vanes has a constant thickness and each of the plurality of outlet turning vanes has a constant thickness.

16. The heat-exchanger assembly of claim 12, wherein the first direction is parallel to the central axis.

17. The heat-exchanger assembly of claim 12, wherein the shroud housing includes a first wall aligned with and coupled to the first side wall of the inlet vane frame, a second wall circumferentially spaced apart from the first wall and aligned with and coupled to the second side wall of the inlet vane frame, and a third wall extending circumferentially between and interconnecting the first wall and the second wall, and wherein the third wall is radially aligned with the outer wall of the bypass duct.

18. The heat-exchanger assembly of claim 12, wherein the heat exchanger is arranged at an angle relative to the bypass duct such that the heat exchanger extends radially inwardly and axially forward from the outer wall to the inner wall of the bypass duct.

19. A gas turbine engine comprising:

a bypass duct configured to direct air through a flow path to provide thrust to propel the gas turbine engine, the bypass duct arranged circumferentially around a central axis of the gas turbine engine and including an outer wall that defines an outer boundary of the flow path and an inner wall that defines an inner boundary of the flow path, the air being discharged from the flow path of the bypass duct through an outlet of the bypass duct that defines a terminal end of a fan section of the gas turbine engine, wherein the inner wall of the bypass duct includes a first segment that extends parallel to the central axis, a second segment coupled to the first segment and extending radially inwardly therefrom perpendicular to the central axis, and a third segment coupled to the second segment and extending axially aft therefrom and parallel to the central axis, the first segment and the second segment coupled to one another to define a corner of the inner wall, and a heat-exchanger assembly configured to receive a first portion of the air flowing through the flow path of the bypass duct and to divert a second portion of the air flowing through the flow path around the heat-exchanger assembly, the heat-exchanger assembly extending entirely radially between the outer wall and the inner wall of the bypass duct so that the heat-exchanger assembly abuts each of the outer wall and the corner of the inner wall, the heat-exchanger assembly including:

a heat exchanger configured to transfer heat from a fluid to be cooled passing through the heat exchanger to the first portion of the air, the heat exchanger arranged in the bypass duct at an angle relative to the central axis of the gas turbine engine, and the heat exchanger having an inlet side and an outlet side spaced apart from and opposite the inlet side, an inlet shroud configured to change a direction of the first portion of the air flowing through the flow path toward the heat exchanger, the inlet shroud including an inlet vane frame coupled with the inlet side of the heat exchanger and a plurality of inlet turning vanes coupled with the inlet vane frame and configured to turn and direct the first portion of the air into the heat exchanger, and an outlet shroud configured to change the direction of the first portion of the air flowing out of the heat exchanger, the outlet shroud including an outlet vane frame coupled with the outlet side of the heat exchanger and a plurality of outlet turning vanes coupled with the outlet vane frame and configured to turn and accelerate the first portion of the air exiting the heat exchanger so that the first portion of the air flows substantially parallel to the central axis to minimize concentrated cooling on the inner wall of the bypass duct and to minimize mixing losses downstream of the heat-exchanger assembly, wherein each of the plurality of inlet turning vanes includes a leading edge and a trailing edge opposite the leading edge of a respective inlet turning vane, and the trailing edge of each of the plurality of inlet turning vanes is formed to include notches that extend into the trailing edge toward the leading edge to increase uniformity of a velocity profile of the first portion of the air exiting the inlet shroud and entering the heat exchanger, wherein each of the plurality of outlet turning vanes includes a leading edge and a trailing edge opposite the leading edge of a respective outlet turning vane, and the trailing edge of each of the plurality of outlet turning vanes is formed as a continuous trailing edge without notches.

* * * * *